Jan. 17, 1939.　　　R. W. PARRY　　　2,144,268
SOOT AND FLY ASH TRAP
Filed April 30, 1936
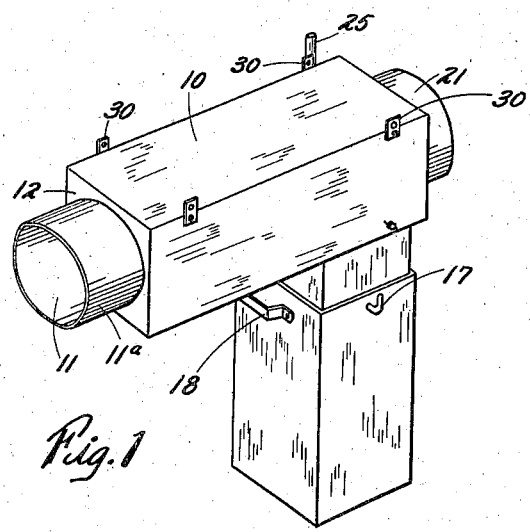
Fig. 1
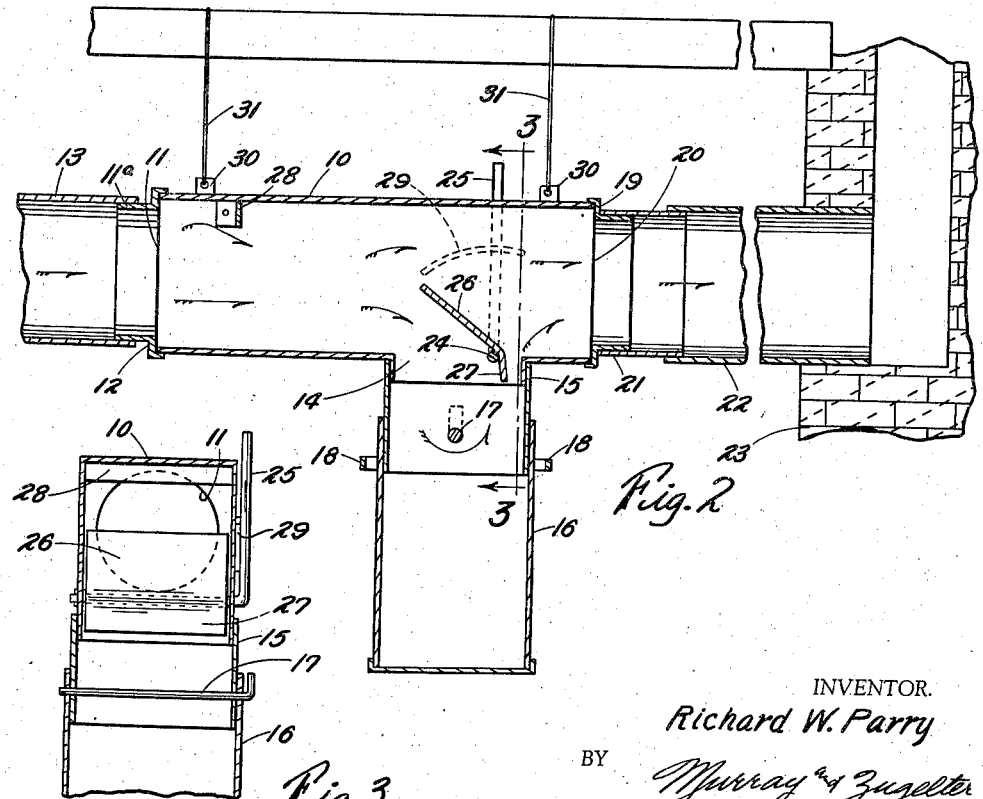
Fig. 2
Fig. 3
INVENTOR.
Richard W. Parry
BY
ATTORNEYS Patented Jan. 17, 1939

2,144,268

UNITED STATES PATENT OFFICE 2,144,268

SOOT AND FLY ASH TRAP

Richard W. Parry, Cincinnati, Ohio

Application April 30, 1936, Serial No. 77,181

2 Claims. (Cl. 183—111)

The present invention relates to a trap means for removing and collecting solid particles such as soot and fly ash from the products of combustion during passage through the flues of furnaces and other fuel burning devices, and has for an object the provision of a simple and inexpensively made trap for these objectionable products.

Another object of the invention is to provide a device for the purposes stated that does not materially interfere with the draft of a furnace.

Another object of the invention is to provide in a trap of this kind a means for collecting the soot, fly ash and the like which is adapted to be emptied in an easy and cleanly fashion.

Another object of the invention is to provide a structure for the purposes stated that is quickly adjustable to establish the normal course of smoke and stack products while the previously collected material is being emptied from the trap.

A further object of the invention is to provide an arrangement whereby the objectionable particles in suspension in the products of combustion are induced to separate from the volume of products of combustion leaving the furnace and to arrest and collect the separated particles while allowing the substantially particle freed gaseous products to be passed on and discharged eventually into the stack.

These and other objects are attained by the means described herein and disclosed by way of operative example in the accompanying drawing, in which:

Fig. 1 is a perspective view of a device embodying the invention.

Fig. 2 is a cross sectional elevational view showing a typical installation of a device of the invention in a flue, parts being broken away.

Fig. 3 is a view taken on line 3—3 of Fig. 2.

The present invention provides means adapted for convenient disposition in the flue pipe line of a furnace of any type, between such furnace and the stack or chimney whereby the products of combustion leaving the furnace are subjected to the effects of expansion and deflection before again resuming their flow through the normal flue pipe and stack under the influence of stack draft.

The effect of this simple structure upon the products of combustion appears to compare favorably in essential respects with the behavior of a confined stream of liquid with particles in suspension therein, particularly in that the soot and fly ash particles, and possibly carbon, tend to coalesce and settle as they pass through the device so that the deflection of the heavier portion of the stream of products of combustion is caused to lose these objectionable particles and deposit them before the remaining gaseous products of combustion are carried away through the flue pipe and stack. The products of combustion entering the device of the invention may be said to become flocculent with a resultant precipitation or settling of the objectionable particles which are collected for convenient removal from time to time. By deflecting the denser portion of the stream of combustion products out of the normal path of travel, a high proportion of the objectionable particles which would otherwise be discharged from the stack are caused to separate completely from the stream of products and to attach themselves to the walls or the previous deposit on the walls of a receptacle communicating with the device.

Referring now to the drawing, Fig. 1 shows a simple and practical embodiment of the device of the invention, and it is to be understood that the invention is not limited to the identical form and structure that is shown by way of example.

The device is conveniently made of sheet metal and comprises an elongated hollow body or expansion chamber member indicated generally as 10. At one end of the chamber 10 is an inlet port 11 surrounded by a collar 11A fixed in the end wall 12 of the chamber. The collar is of a size adapted to couple, in a known telescopic manner, with the end of a section of flue pipe 13 leading from a furnace or fuel burning device (not shown). The chest 10 may be square or rectangular in cross section and the opening therethrough is of greater cross sectional area than the inlet port 11 or the flue pipe 13 which discharges into it. In one side wall, preferably the bottom wall of chamber 10, is an opening 14 of a cross sectional area approximating that of the chamber 10, and an exterior sleeve 15 struck from or secured to the walls of chamber 10 bounds this opening. A snugly fitting receptacle 16 is slidably received over sleeve 15 and is normally retained against accidental removal by a transverse pin 17 which passes through aligned pairs of perforations in the overlapped or telescopically disposed side walls of sleeve 15 and receptacle 16. Handles 18 may be provided on the receptacle to facilitate manipulation thereof, it being contemplated that when the receptacle is to be emptied of its collected contents, a large paper sack may be passed over the mouth of the receptacle whereupon the receptacle is inverted and the contents dropped into the sack.

The opening 14 is desirably disposed relatively close to the outlet end 19 of chest 10 where a discharge port 20, similar to inlet port 11 is disposed and is surrounded by a collar 21 which connects with the flue pipe section 22 that carries the gases to a chimney or stack 23.

Rockably mounted in the opposite sides of chamber member 10 is a transverse shaft 24 having a handle 25 disposed on the outer end thereof for turning the shaft. In practice the bearings for this shaft may be merely a pair of aligned holes in the side walls for snugly receiving the shaft. Shaft 24 is disposed above and across opening 14 and is located so as to unequally divide the area of opening 14 in the following manner: A deflector 26 is secured on shaft 24 and constitutes a major closing member for the opening 14 when the shaft is turned counter-clockwise as viewed in Fig. 2. A minor deflector member 27, which may be an integral part of major member 26, extends on the other side of shaft 24 and is angularly disposed relative to the major portion 26. As it will be clearly seen in Fig. 2, the deflector 26—27 may be moved by shaft 24 to a position wherein member 26 closes the opening 14 between the inlet end and shaft 24 and the minor portion 27 closes the remaining portion of opening 14 by the shaft 24 and the outlet end of the chamber. In this position of the deflector, the opening 14 is closed and the products of combustion may pass from the furnace through flue pipe 13, chamber 10 and directly into flue pipe 22 and the stack. When shaft 24 is rotatably adjusted in the opposite direction, deflector 26 is raised so that part of the products of combustion will be directed downwardly and through the opening 14, into the mouth of receptacle 16. As previously indicated the expansion of the products of combustion leaving the relatively restricted flue pipe 13 and entering the enlarged chamber 10 slow down slightly and at the same time exhibit the phenomena of coalescence of suspended particles of soot and fly ash and a degree of stratification between the denser and lighter components occurs. The denser components are turned downwardly by major deflector 26 through the larger portion of opening 14 controlled thereby. At this point, a complete separation of much of the heavier particle matter is effected and this material deposits upon the inner walls of the receptacle and on previously deposited particles until the "felted" layers of deposited particles drop from said walls and pile up in the bottom of said receptacle. The gases thus freed of suspended particles pass out through the mouth of the receptacle beyond shaft 24 and mingle with the lighter and hotter gaseous products which passed above deflector 26 without being dominantly deflected thereby. The resultant streams of gaseous products of combustion are merged and drawn through the outlet port 20 and flow through the remaining flue pipe section 22 without sufficient diminution of velocity to detrimentally affect the normal furnace draft. For those furnace installations embodying forced draft in conjunction with mechanical stokers the impairment of draft is entirely negligible. In furnace installations depending upon normal draft, the adjustment of deflector 26 may be varied by lowering deflector 26 to a position wherein the furnace draws satisfactorily and the angle of the deflector relative to the mouth of the opening 14 still permits of as great a volume of the products of combustion as possible to be passed through opening 14.

It is to be understood that while the embodiment of the invention herein illustrated is one that is primarily adapted for use with coal burning domestic heating plants, the device in substantially identical form may be adapted to many industrial fuel burning devices. The form of the device may be modified to accommodate it to different forms of furnaces and to enable the installation of soot traps of the invention to various flue pipe installations. The essential factors of the device of the invention in whatsoever form will in each instance, constitute an expansion chamber and a collection receptacle communicating therewith at an angle to form portion of the established path of products of combustion from furnace to stack. It has been found helpful in some instances in attaining a high percentage of foreign particle extraction from the flue products to provide a baffle 28 across the upper interior of expansion chamber 10 at a point intermediate inlet port 11 and the opening 14. It is believed that if eddies are set up in the stream of combustion products at the time the precipitation of particles begins, stratification between the denser and lighter components is fostered thereby. The deflector is adapted to be retained in lowered or adjusted raised positions by any suitable means as for example, by an external segment 29 fixed on the wall of expansion chamber 10 and adapted for frictional or notched engagement with the handle 25.

The devices of the invention are adapted to both domestic and industrial furnaces. They are relatively inexpensive to install and easy to clean.

What is claimed is:

1. In a device of the class described the combination with a flue pipe adapted to receive the products of combustion from a fuel burning furnace, of an expansion chamber connected to said flue pipe and into which the flue pipe discharges the products of combustion and unimpeded permits them to expand, a receptacle communicating with the expansion chamber remotely of the receiving end thereof and into which a portion of the expanded products of combustion may be directed, an adjustable deflector mounted on a pivot, said pivot lying transversely of and unequally dividing the mouth of the receptacle, said deflector adapted in one position to close communication between the receptacle and the expansion chamber and in all other of its adjusted positions to direct different amounts less than the total of the products of combustion to said receptacle through the larger portion of the communicating area and thence beneath the deflector and out through the smaller portion of said communication area into the expansion chamber to therein merge with the expanded and non-deflected combustion products, the expansion of said combustion products serving to coalesce suspended particles therein and said deflector serving to divide the expanded products and to assist in the separation and deposit of said particles in the receptacle.

2. A soot and fly ash trap comprising an expansion chamber having inlet and aligned outlet ports and a bottom opening intermediate said ports, a receptacle mounted in communicating relation below the opening, a deflector mounted on a pivot, said pivot lying in the plane of and transversely of said opening and manually adjustable to effect complete closure of the opening and to selectively raised positions wherein the flow of expanded combustion products through the expansion chamber is divided into a deflected and a non-deflected portion, said deflected portion being separately entered and exited through the several portions of the divided opening and then merged beyond the deflector with the non-deflected combustion products within the expansion chamber.

RICHARD W. PARRY.